United States Patent [19]

Karpik et al.

[11] 4,166,872

[45] Sep. 4, 1979

[54] MIGRATION-RESISTANT FORMING SIZE COMPOSITIONS FOR FIBROUS GLASS

[75] Inventors: Richard H. Karpik, Anderson, S.C.; David H. Griffiths, Shelby, N.C.

[73] Assignee: Owens-Corning Fiberglas Corporation, Toledo, Ohio

[21] Appl. No.: 541,760

[22] Filed: Jan. 17, 1975

Related U.S. Application Data

[63] Continuation of Ser. No. 285,166, Aug. 31, 1972, abandoned, which is a continuation of Ser. No. 523,498, Jan. 12, 1966, abandoned, which is a continuation-in-part of Ser. No. 92,745, Mar. 2, 1961, abandoned.

[51] Int. Cl.$^2$ ............................ C03C 7/30; C08L 3/02
[52] U.S. Cl. ...................................... 428/35; 106/211; 106/213; 428/378
[58] Field of Search ..................... 106/210, 211, 213; 65/3; 428/35, 378, 532

[56] References Cited

U.S. PATENT DOCUMENTS 3,265,516   8/1966   Triplett ................................ 104/213

FOREIGN PATENT DOCUMENTS 631196   10/1963   Belgium .................................. 106/213
1363976   5/1964   France ..................................... 106/213

*Primary Examiner*—Theodore Morris
*Attorney, Agent, or Firm*—John W. Overman; William P. Hickey

[57]          ABSTRACT

This invention relates to coating materials for fibrous glass and particularly to non-migrating forming size compositons for glass fibers, namely an aqueous size composition comprising a starch solution containing swollen but unburst partially cooked starch granules made from an amylaceous material.

11 Claims, No Drawings

MIGRATION-RESISTANT FORMING SIZE COMPOSITIONS FOR FIBROUS GLASS

This application is a continuation of Ser. No. 285,166, filed Aug. 31, 1972; which is a continuation of Ser. No. 523,498, filed Jan. 12, 1966; which is a continuation-in-part of Ser. No. 92,745, filed Mar. 2, 1961, all now abandoned.

Glass fibers are conventionally provided with a size composition or coating immediately upon their formation. This measure is affected due to the qualities of mutual abrasion and susceptibility to moisture attack which are inherent in glass fibers and which cause extensive attrition in the form of processing inspired abrasion and chemical degradation. Consequently, a principal ingredient of such forming size compositions is a film-forming material which serves to provide a protective sheath about the fibers and functions to shield the fibers against both abrasion and moisture attack. In addition to the film-former, a forming size may conventionally embody lubricants, coupling agents, emulsifiers, additional film-forming materials and the like.

The efficacy of a forming size is largely dependent upon its ability to provide an adequate film or cushioning structure and lubricity. However, other factors in the form of economics, processing characteristics, etc., also enter into size formulation.

Due to reasons of economy, film-forming qualities and ease of removal, starch has assumed a predominant position among the candidate film-forming materials. Despite the "plastic age", the constantly diminishing cost of synthetic resins and their generally acceptable characteristics, starch has remained the favored film-forming material for forming sizes employed upon fibrous glass yarns utilized in the weaving industry.

However, the use of starch based sizes has long been plagued by a phenomenon termed "migration" which comprises the movement of the solids content of forming size compositions to the outer surface of the wound packages or bobbins which are formed from the sized glass fibers. Investigation has revealed that such migration is not the product of the centrifugal forces encountered during the winding of the glass fibers into the package form since checks made immediately after winding fail to reveal any traces of the phenomenon.

The detrimental aspects of migration are realized in the form of non-uniform processing characteristics and aesthetic and practical detractions which are experienced in both the ultimate products and the intermediates.

Chief among such drawbacks is an effect termed "color banding" which is encountered in fabrics formed from migration affected fibrous glass strands or yarns. Fibrous glass fabrics are subjected after weaving to a heat treatment which serves to set the weave or permanently crimp the fibrous glass yarns in the woven relationship. This treatment is employed to enhance the durability, handle, drape and general appearance of the fabrics and the high temperatures necessary to achieve the weave setting, simultaneously result in the volatilization or decomposition of the forming size present upon the fibers incorporated in the fabric. The latter result is desirable in that subsequent processing such as lamination with resins, or finishing treatments in which a resin and pigment are applied, might otherwise prove incompatible with the size composition if it were allowed to remain upon the fabrics.

However, when a non-uniform size coating is present upon the glass fibers, as is the case with glass fibers which have experienced migration, a variety of problems arise. For example, a temperature adequate to remove a normal size coating will merely sufficie to "carmelize" or carbonize the high solids or excessively coated areas which result from migration. As a consequence, such fabrics are plagued by a variegated or "color banded" appearance which renders them unsuitable for conventional uses.

In addition, in order to crimp or set the fibers in their woven relationship, temperatures which enable the softening of the glass and which approach the fusion point of the glass are employed. In the case of migration affected glass fibers, it appears that the high solids areas act as heat sinks or areas of concentrated heat which bring about the fusion of the fibers despite the fact that oven temperatures are controlled to prevent such fusion.

Another serious problem is experienced as a result of the non-uniform tension characteristics occasioned by the migration affected areas. Such characteristics are particularly detrimental in processing such as weaving wherein the apparatus is closely adjusted to the tension characteristics of material being woven and deviations are reflected in product defects or work stoppages.

An additional defect is realized in the form of broken filaments or "fuzz", the occurrence of which is more predominant in migration affected yarns. Such breakage is detrimental not only in respect to unsightly products and diminished strengths, but also in regard to processing where the trailing broken ends serve to snarl, snag and generally hamper the processing. While the prevalence of broken filaments in migration affected yarns is not readily explicable, it would appear that it is a result of the fact that the migration phenomenon is attended not only by the deposition of high solids concentrations, but also by undercoated areas which result when the relatively uniform coating is disproportionated and size solids are withdrawn or migrated from one area to result in solids concentrations in another area. Consequently, the undercoated or even unsized areas would be lacking in protection and highly susceptible to abrasion and attendant fiber breaks.

It is an object of the present invention to provide starch based forming size compositions for fibrous glass which are free from a migration tendency and which provide improved size characteristics.

A further object is the provision of methods for the preparation of starch sized glass fibers which are free from the migration tendency.

A still further object is the provision of glass fibers having a coating thereon of an aqueous starch solution containing swollen but unburst partially cooked starch granules.

The aforegoing objects are achieved by means of an aqueous size composition comprising a starch solution containing swollen but unburst partially cooked starch granules made preferably from an amylaceous material possessing an unusual amylose-amylopectin ratio. These compositions of the invention are utilized in an aqueous medium and contain conventional forming size lubricants.

It should be noted that previous starch based forming sizes have utilized conventional corn starches wherein the amylose-amylopectin ratio is normally 25:75. The preferred starch employed in the present invention is derived from a hybrid corn and possesses an amylose to amylopectin ratio of approximately 60:40 and may vary between 50% and 70% by weight of amylose. The hybrid material is available from the National Starch Co. under the tradename "Amylon".

While the preferred material having extremely low migration tendency and improved processing characteristics is made from a material having a high amylose-amylopectin ratio and containing swollen partially cooked starch granules, an improvement in any starched composition can be had by causing a purposeful amount of swollen unburst or partially burst starched granules to be present.

As previously mentioned, conventional lubricants such as animal and vegetable oils, amine condensates and the like or a combination thereof, may be employed. The emulsification of such lubricants may also be enhanced by the use of conventional emulsifiers.

Other conventional additives such as plasticizers, dispersing agents, wetting agents and the like may also be employed.

The materials of the preferred composition are preferably employed in proportional ranges set forth below in percentage by weight:

| Hybrid corn starch | 1.5–9 |
| Animal or vegetable oil | .5–6 |
| Emulsifier | .025–2.5 |
| Cationic lubricant | .05–1.5 |
| Water | Remainder |

The animal or vegetable oils employed are conventional natural or synthesized glycerol esters and may be utilized in a hydrogenated form.

Any cationic lubricant can be used. Suitable examples are amine-acid compounds such as amides or amine-acid condensates derived from the reaction of amines and normal monocarboxylic saturated acids or fatty acids.

The cationic-nonionic lubricant combinations employed appear to yield the penetration and bonding desired by virtue of the fact that the nonionic lubricant insures the penetration and thorough lubrication of the plural fiber strand while the cationic lubricant exhibits an affinity for the anionic surfaces of the glass fibers.

While polyethylene glycol is a preferred emulsifier, other conventional emulsifiers such as ethylene glycol esters, alkyl aryl polyoxyethylene alcohols, polyalkylene amines, polyoxyethylene esters, amine condensates, and the like, may be employed.

In a preferred formulation, the following ingredients are employed as set forth in the following example:

EXAMPLE

| Hybrid corn starch | 4.9 |
| Hydrogenated vegetable oil | 1.18 |
| Polyoxyethylene norbitan monooleate | 0.19 |
| Tetraethylene pentamine diatearate | 0.22 |
| Polyethylene glycol | 1.15 |
| Water | Remainder |

A forming size composition is prepared from the above ingredients by placing all of the starch and one-half of the water in a suitable receptacle, adjusting the pH to 6.0±0.2 with hydrochloric acid and cooking the starch. The vegetable oil and polyoxyethylene sorbitan monooleate are then separately admixed at 150°–170° F., agitated until the inversion of the emulsion and preferably homogenized at 2000 pounds per square inch and the emulsion, the tetraethylene pentamine distearate and the remainder of the water are added to the starch cook and agitated. While the starch in the process above-described is cooked in conventional equipment using conventional techniques as, for example, an open tank or receptacle at substantially atmospheric temperature and pressure, other suitable methods of cooking the starch can be used. A high amylose starch of approximately 60% amylose and 40% amylopectin does not completely cook using conventional techniques and equipment. The high amylose material when cooked at atmospheric temperature and pressure for a conventional length of time, causes the starch granules to become greatly swollen with only a small percentage of the granules burst. The material dissolved from unburst granules and that from burst granules provide a solution which surrounds the swollen granules. Other means of cooking starch can be used. One convenient type of apparatus that can be used for cooking the starch is a continuous flow jet cooker. Continuous flow jet cookers are made by various manufacturers all of which utilize a small pressure chamber having an inlet at one end through which a starch slurry is continuously pumped. A plurality of small steam jets surround the inlet. The steam jets are arranged to swirl the slurry and instantaneously bring it to the desired cooking temperature. A discharge valve is provided on an outlet of the chamber with a temperature bulb immediately upstream of the back pressure valve. Following the discharge valve the material is piped to a tank having a cooling jacket thereon or other suitable cooling means to immediately reduce the temperature to appreciably below the cooked temperature so that the degree of cook will be maintained constant. The volume of the jet cooker chamber is usually quite small, and usually has approximately a half gallon capacity. The length of time that the starch slurry is at cooking temperature in the chamber may vary somewhat, but is usually approximately ½ second before exit through the back pressure valve. Thereafter flow through the discharge piping may take approximately 10 seconds before the cooked starch is dumped into the hold tank. The temperature of the cooked starch is, of course, immediately lowered to that of the hold tank by being mixed with the starch solution therein. Even with such equipment a 60:40 high amylose starch is not completely cooked unless unconventionally high steam flows and resulting cooking temperatures are used.

The size compositions of the invention are applied to glass fibers immediately after forming and by conventional means. In a preferred method, an apron type applicator such as that disclosed by U.S. Pat. No. 2,873,718 is positioned adjacent to the path of the fibers, and immediately below the fiber-forming bushing, and the size compositions are transferred from the moving apron of the applicator to the glass fibers. However, other conventional contact, immersion or spray application methods may be employed. For example, pad or roller applicators as disclosed by U.S. Pat. Nos. 2,390,370; 2,778,764; 2,693,429 or 2,742,737, immersion apparatus as disclosed by U.S. Pat. No. 2,732,883 or spray or jet means such as in U.S. Pat. Nos. 2,491,889 or 2,846,348 may also be utilized.

The success of the size compositions of the invention in combatting migration is aptly demonstrated by the following table wherein the deviation in solids between the strands at the interior and exterior of wound packages of starch sized fibrous glass yarn is set forth:

| SIZE COMPOSITION | SIZE SOLIDS AT INTERIOR (% by weight) | SIZE SOLIDS AT EXTERIOR (% by weight) |
|---|---|---|
| Conventional corn starch film-former | | |
| A | 1.85 | 5.45 |
| B | 1.83 | 4.84 |
| Hybrid corn starch film-former partially cooked | | |
| 1 | 1.60 | 2.06 |
| 2 | 1.64 | 1.97 |
| 3 | 1.66 | 1.88 |
| 4 | 1.63 | 1.89 |
| 5 | 1.63 | 1.81 |

In the attainment of the above data, Samples A and B were sized with a conventional corn starch based size composition while samples 1-5 were sized with the composition of the example, wherein the starch film-former was hybrid corn starch having an amylose-amylopectin ratio of approximately 60:40. The numerical values were derived by selecting yarn samples from both the exterior and interior of the wound packages, oven heating the samples to a temperature of 750° F. and recording the weight loss as a percentage of the weight of the coated strand prior to heat cleaning.

It can be readily perceived that the size compositions of the invention exhibit only an 18% quantitative deviation between strands selected from the interior and exterior of the package, while conventionally sized strands exhibit a 180% deviation. The distinction is also reflected by the fact that the exterior or migration affected strands of the conventionally sized fibers, bear an average of 5.14% solids while the exterior strands sized with the compositions of the invention bear an average of 1.45% solids.

It will be apparent to those skilled in the art that the clearance between the filaments of a strand as well as the clearance between the strands of a wound package of glass fibers is very small and that these wound fibers act as a filter. It will further be apparent that the swollen and unburst partially cooked starch granules and partially burst sacs or husks are considerably larger than the distance between wound filaments and that these unburst swollen granules act as a filter aid for preventing the migration of the particles of starch that have been released from burst granules and which form what is sometimes called a starch solution. This mechanism accounts for the extremely low percent of migration given above for the partially cooked high amylose starch materials described above.

The degree of cook of a starch depends primarily upon the temperature of cook and will vary to a lesser degree with the time at the cooking temperature. The corn starch used in Examples A and B above, have an amylose-amylopectin ratio of approximately 20 to 80, and the granules of the corn starch are completely burst at conventional cooking temperatures which are considerably lower than is necessary to completely cook the high amylose starch having a ratio of approximately 60:40. Because the high amylose starch requires a cooking temperature greatly in excess of conventional cooking temperatures in order to accomplish a complete bursting of all of the starch granules, the degree of cook of high amylose starch can be more easily controlled than can the degree of cook of conventional starches. In general, starches having an amylose content of from 40% by weight to 70% by weight have high cook temperatures and are preferred.

A slurry comprising 10% by weight of the 60:40 high amylose starch material was made at 72° F., and a droplet of the completely mixed material was placed between two glass slides and photographed at 420 magnification. The starch granules were readily apparent and each included the customary cross seen on naturally occurring starches indicating the completely uncooked state of the starch.

A similar 10% slurry of the material was pumped through a continuous jet cooker of the type manufactured by the Thermal Equipment Company and which was operated at a discharge temperature of 160° F. A drop of this material was placed between glass slides and photographed at 420 magnification. The photograph reveals that most of the material cooked at this temperature still has the crosses evident and that only a small percentage of the material is swollen. In some of the swollen granules a faint cross can still be observed.

A 10% solution of the high amylose material was prepared and pumped through a continuous jet cooker operated at a temperature of 190° F. This material was placed between glass slides and photographed at 420 magnification. The photograph shows that substantially all of the granules are swollen with some of the granules still having a cross faintly evident. A comparison of the number of granules present with that in the uncooked material, indicates that substantially none of the granules are completely burst at this cook temperature.

A 10% slurry of the 60:40 high amylose material was pumped through a jet cooker operated at a discharge temperature of 220° F. and a drop of the material was placed between glass slides and photographed at 420 magnification. The photograph shows that substantially all of the area is occupied by swollen starch granules some of which have a faint cross still observable. It appears that only a small percentage of the starch granules are burst and that all of the remainder are greatly swollen.

Other tests indicate that the jet cooker must be operated at a temperature of approximately 300° F. using the same residence time of the previous tests in order to provide a completely cooked high amylose 60:40 starch. The residence time in the cooker in each of the above tests was approximately ½ second.

The high amylose 60:40 starch when cooked in a jet cooker operated at a discharge temperature of 220° F. and when applied to a glass fiber produces a fiber having swollen unburst starch granules uniformly distributed over its surface. The unburst granules are held in place by a thickened starch solution resulting from burst starch granules. As previously indicated the swollen unburst starch granules become lodged in the space between the wound glass fibers to act as a filter aid and prevent migration of the starch material held in solution during the drying of the wound package of fibers.

Although partially cooked starch solutions can be prepared most easily from a high amylose starch material as for example the 60:40 material described above because of the high cooking temperature necessary, a similar physical arrangement can be obtained utilizing any natural occurring starch by reason of a partial cook. This has been shown by tests of a conventional corn starch having an amylose to amylopectin ratio of approximately 20:80. A 5% by weight solution of this corn starch material was cooked in an open kettle at 212° F. for 30 minutes to provide a solution with no apparent unburst starch granules. This material was applied to glass fibers before being drawn together into a strand, and a photograph of the strand was made at a 240 magnification. The photograph reveals no unburst starch granules bur does show some foreign material which may be the residue of the husks which surround the starch granules as well as other foreign materials usually found in naturally occurring starches. A 5% solution of the same corn starch material was cooked in a kettle by raising its temperature until it reached a temperature of approximately 170° F. following which the kettle was cooled. This material was applied to fibers at forming as described above, and these fibers were drawn into a strand. The strand was photographed at a magnification of 240 and the photograph indicates a considerable number of swollen unburst starch granules dispersed among the individual fibers forming the strand. The structure is substantially the same as that provided by the partially cooked high amylose material cooked in an open kettle at approximately 212° F. as described above.

As previously indicated it is the swollen uncompletely disintegrated starch granules which are caught between the fibers of the strands of a wound package which trap and greatly retard migration of the dissolved starch particles of a starch solution during drying. The swollen unburst starch granules can be of any natural occurring starch regardless of the amylose-amylopectin ratio, and can be of chemically treated starches so long as the treating processes do not burst all of the naturaly occurring starch granules. Naturally occurring starch granules have an outer shell, commonly called a husk, which provides integrity for the starch granules even when swollen. The method by which the starch material is cooked is unimportant so long as swollen but uncompletely burst and disintegrated starch granules are provided in the finished cooked slurry. Partially burst husks appear to be softer and are preferred to hard unburst granules. The provision of uncompletely burst granules can be accomplished by using two different starch materials one of which has a lower cooking temperature than the other, so that one of the materials provides the starch solution while the other material provides the swollen starch granules. By way of example, a slurry containing 10% by weight of a 60:40 high amylose starch material was prepared and to this slurry was added 1% by weight of a corn starch having an amylose-amylopectin ratio of 20:80. This mixture was cooked in a continuous jet cooker operated at a temperature of 220° F. and was applied to fibers at forming before they were gathered together into a strand. The resulting strand was photographed at 240 magnification and the photograph of the strand shows the swollen unburst starch granules dispersed throughout the fibers. The material appears to be very similar to that produced when a 10% slurry of the high amylose material is cooked alone under similar circumstances.

Still other methods of insuring swollen unburst partially cooked starch granules in the starch solution can be used. As for example, a 5% slurry of a corn starch having a 20:80 amylose-amylopectin ratio was cooked in an open kettle at 212° F. for 30 minutes. This material was cooled to a temperature of approximately 140° F. and thereafter uncooked corn starch was added in an amount equal to 5% of the resulting composition. The starch granules of the uncooked corn which was added became swollen but unburst, and this material was applied to glass fibers after forming prior to being drawn into a strand. The strand was photographed at 240 magnification. This photograph reveals a larger amount of the swollen unburst starch granules distributed throughout the fibers of the strand than does the photograph of the corn starch cooked at 170° F.

All of the strands above-described except that coated with the completely cooked corn starch resists migration by reason of the above-described mechanism. Tests indicate that migration is reduced when the amount of uncompletely burst starch granules comprises more than about 10% of the solid content of the starch solution, or approximately 0.2% by weight of the coated glass fibers. A noticeable increase in the effectiveness in reducing migration is noticed when the unburst granules comprise approximately 18% by weight of the total starch in the solution or approximately 0.36% by weight of the coated fibers. A preferred material comprises approximately 23% uncompletely burst granules. Acceptable coatings are formed when 80% of the starch solution is swollen unburst starch granules. In general the amount of migration experienced reduces as the amount of uncompletely burst starch granules increases, but no further improvement is experienced at concentrations above approximately 80%. The character of the starch solution containing the uncompletely burst starch granules is of secondary importance and can be a solution which forms a starch film on the fibers only upon drying, or can be one which gels upon a drop in temperature to form a film on the fibers. The later type of film is formed when the solubilized starch forming the starch solution comprises a high percentage of amylose. Such a material is formed by the preferred 60:40 material when partially cooked as described above.

It is apparent that novel size compositions and methods for sizing fibrous glass, as well as starch sized fibrous glass, all of which are free of the migration tendency, are provided by the invention.

It is further obvious that various changes, alterations and substitutions may be made in the invention without departing from the spirit of the invention as defined by the following claims:

We claim:

1. In the coating of glass fibers with a forming size composition which contains an aqueous dispersion of an amylaceous film-forming material, the improvement comprising the utilization of a hybrid corn starch consisting essentially of between 50 to 70% by weight of amylose and between 30 to 50% by weight of amylopectin, cooked at a temperature below approximately 212° F. as said amylaceous film-forming material, and whereby said fibers are coated with a starch material that includes swollen unburst starch granules.

2. An aqueous forming size composition for glass fibers consisting essentially of: between 1.5 to 9% by weight of corn starch granules, between 0.5 to 5% by weight of a nonionic lubricant, and between 0.05 to 1.5% by weight of cationic lubricant, there being sufficient of said starch granules present at the degree of swelling wherein the crosses on the surface of the granules are being dissipated to retain the solid materials of the size in situ on the fibers during drying.

3. A wound package of a strand of glass fibers the strand of which comprises generally parallel glass fibers in side-by-side engagement with the individual glass fibers of the strand having a coating thereon which contains sufficient swollen starch granules that are in the bursting stage to effectively act as a filter aid and retain solid materials of the coating in situ when the package contains water and the water migrates to the surface of the package.

4. The wound package of claim 3 in which the granules which are in the bursting stage comprise more than approximately 10% by weight of the starch of the coating.

5. The wound package of claim 3 wherein the granules which are in the bursting stage have an amylose content of more than approximately 40% by weight.

6. A wound package of a strand of glass fibers the strand of which comprises generally parallel glass fibers in side-by-side engagement with the individual glass fibers of the strand having an aqueous coating thereon comprising the following solids in approximate percentages by weight: from 1.5 to 5 of starch, from 0.05 to 6 of nonionic lubricant, from 0.025 to 2.5 of an emulsifier for the nonionic lubricant, and from 0.05 to 1.5 of cationic lubricant, and with at least 10 percent of the starch being present in the form of swollen granules which are in the bursting stage.

7. A strand of glass fibers the fibers of which have a starch base coating thereon with at least 10% by weight of the starch being present as swollen granules that are in the bursting stage.

8. The strand of claim 7 wherein said granules have an amylose content of more than approximately 40% by weight.

9. A strand of glass fibers the fibers of which have an aqueous coating thereon comprising the following solids in approximate percentages by weight: from 1.5 to 9 of starch, from 0.5 to 6 of nonionic lubricant, from 0.025 to 2.5 of an emulsifier for the lubricant, and from 0.05 to 1.5 of cationic lubricant, and with at least 10 percent of the starch being present in the form of swollen and incompletely disintegrated starch granules.

10. A strand of glass fibers the fibers of which have a coating thereon comprising the following solids in approximate parts by weight: from 1.5 to 9 of starch, from 0.5 to 6 of nonionic lubricant, from 0.025 to 2.5 of an emulsifier for said lubricant, and from 0.05 to 1.5 of cationic lubricant, and with at least 10 percent of the starch being present in the form of swollen and incompletely disintegrated starch granules.

11. The strand of claim 10 wherein said incompletely disintegrated starch granules have an amylose to amylopectin ratio of at least 40% by weight.

* * * * *